United States Patent [19]
James

[11] Patent Number: 5,592,156
[45] Date of Patent: Jan. 7, 1997

[54] UNDERWATER ALPHA-NUMERIC COMMUNICATION SYSTEM

[76] Inventor: Robert James, 2805 SW. 22nd Ave. #104, Delray Beach, Fla. 33445

[21] Appl. No.: 539,618

[22] Filed: Oct. 5, 1995

[51] Int. Cl.⁶ .................................................. H04B 11/00
[52] U.S. Cl. ........................................ 340/850; 367/134
[58] Field of Search .......................... 340/850; 367/131, 367/132, 134; 455/89, 90

[56] References Cited

U.S. PATENT DOCUMENTS

| | | | |
|---|---|---|---|
| 3,909,773 | 9/1975 | Saltzer | 367/134 |
| 4,203,109 | 5/1980 | Ballard et al. | 340/850 |
| 4,336,537 | 6/1982 | Strickland | 340/850 |
| 5,331,602 | 7/1994 | McLaren | 367/134 |

*Primary Examiner*—Ian J. Lobo

[57] ABSTRACT

A bi-directional underwater communication system provides a submerged operator the ability to communicate with a surface operator. Provides two transceivers both containing keypads and displays capable of transmitting and receiving alpha-numeric data. The underwater transceiver is connected to a floating antenna assembly via a small cable.

19 Claims, 4 Drawing Sheets

UNDERWATER ALPHA-NUMERIC COMMUNICATION SYSTEM

BACKGROUND—FIELD OF INVENTION

This invention relates to radio communication systems, and more particularly to underwater radio communication systems which provide a submerged operator the capability to receive and send data with a station on the surface.

BACKGROUND—DESCRIPTION OF PRIOR ART

In the past the need for communication between a diver and a vessel arose primarily from underwater construction teams and submersible vessels. Today there are many more recreational divers and the need for reliable communication between diver and vessel is very common. This need stems from the dangerous nature of scuba diving. For instance divers below the surface are unaware of approaching storms, decaying sea conditions, or vessel malfunctions. Accordingly, vessel captains are unaware of special assistance divers may be in need of such as bearings to a reef, a lift bag, a spear gun, or emergency assistance.

Many inventions sought to resolve this problem by the transmission of audio data. One approach is to transmit a signal though the water similar to a radio transmission through the air. This method requires complicated circuitry to receive and reproduce reliable audio data. Also this method commonly requires the use of a special mask or regulator for the diver to speek into and a special earphone. The use of a special mask and earphone complicates standard recreational diving as well as requires divers to purchase new and expensive diving gear. Another approach is to use a floating antenna to receive the signal and a cable connecting the antenna to the diver. This approach also requires the use of a special mask or regulator for the diver to speak into and a special listening device such as an earphone.

The transmission of alphabetical and numerical (alpha numeric) data to an underwater diver has also been proposed. This method makes use of a cable directly linking the vessel to the diver. Here alpha-numeric data is transmitted to the diver and displayed on an underwater display. This method has limitations due to the volatility of the ocean. For example currents and waves often pull a vessel of course and in doing so could drag any diver tied directly to the vessel. Also maneuvering a vessel while any line is in the water will become very dangerous if that line comes in contact with the vessel's propeller.

SUMMARY OF INVENTION

The present invention provides a communication system consisting of an underwater transceiver and an above water transceiver allowing the operators to receive and transmit alpha-numeric characters. Both transceivers have displays and keyboards. A cable connects the underwater transceiver to a floating antenna and the above water transceiver has a fixed antenna.

OBJECTS AND ADVANTAGES

Several objects and advantages of the present invention are:

(a) to provide a surface vessel engaged in diving operations the ability to communicate with an underwater diver and yet not be directly attached to the diver.

(b) to provide an underwater diver the ability to communicate with a surface vessel while not directly attached to the surface vessel.

(c) to provide a diver an underwater transceiver unit capable of displaying received messages as alpha-numeric characters.

(d) to provide a diver an underwater transceiver unit with a keypad capable of sending alpha-numeric data.

(e) to provide a diver engaged in recreational diving with a transceiver and keyboard small enough not to be of any nuisance and yet easily operable.

(f) to provide an antenna system capable of being connected to a required recreational dive flag.

(g) to provide an antenna system capable of receiving signals from a nearby vessel and relaying the received data to an underwater transceiver via a small cable.

(h) to provide a surface vessel a transceiver capable of displaying a received message as alpha-numeric characters and sending alpha-numeric messages to an underwater diver.

Further objects and advantages of my invention will become apparent from consideration of the drawings and ensuing description.

DRAWING FIGURES

In the drawings, closely related figures have the same number.

DESCRIPTION OF THE INVENTION

Figure 1:
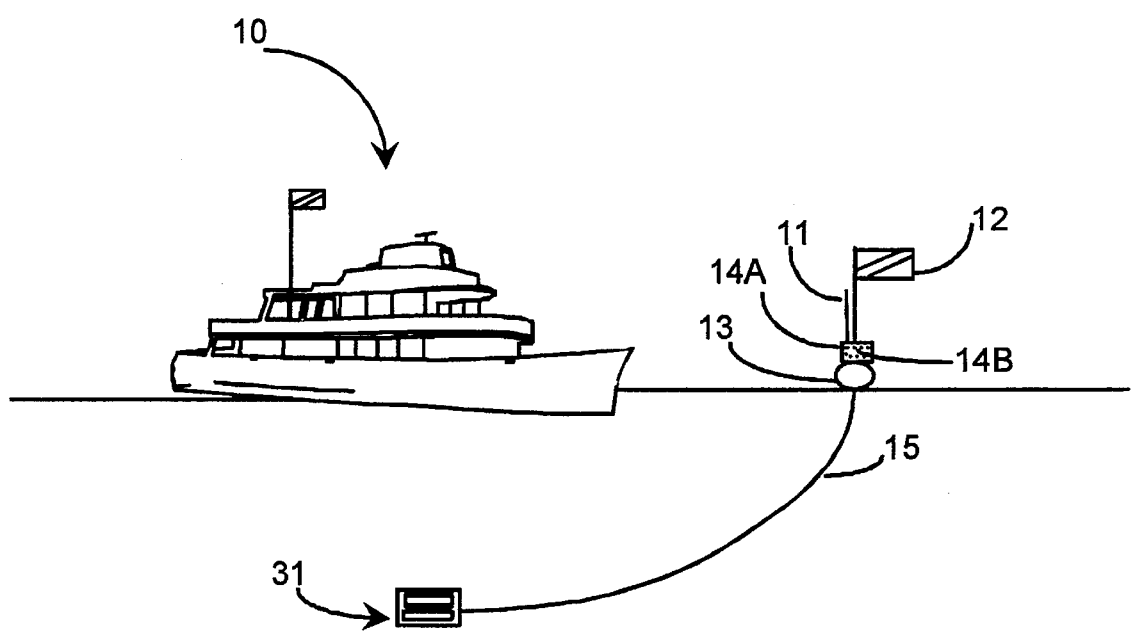
FIG. 1 depicts the general use of the underwater communication system

FIG. 1 shows the preferred embodiment of the present invention of underwater alpha-numeric communication system. Vessel 10 is a vessel engaged in diving operations. A diver beneath the surface commonly carries a line 15 connected to a flag or buoy 12 at the surface in order to warn other vessels of the diver's whereabouts and to allow the diving vessel to follow the diver. This often used flag or buoy 12 is an ideal place to mount the underwater transceiver antenna 11. The base 13 of buoy 12 is most often semi-submerged and is perfectly situated for mounting a transmission network housing 14A containing a transmit and receive network 14B. Transmit and receive network 14B is sealed in a waterproof corrosive resilient casing or transmission network housing 14A and connects to the divers underwater transceiver FIG. 3 via cable 15.

Figure 2:
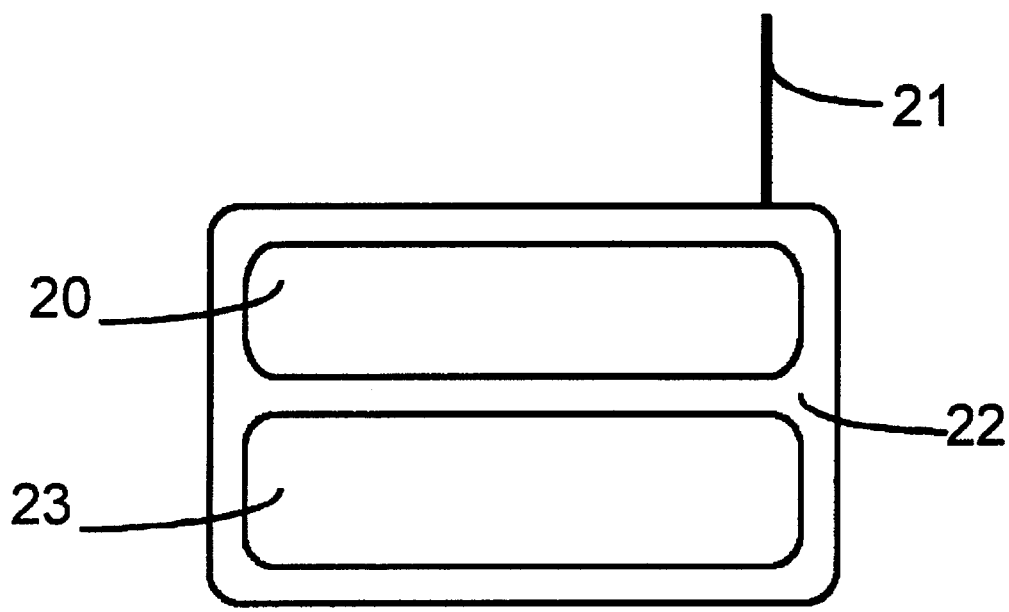
FIG. 2 shows the front view of the onboard transceiver containing a display, keyboard, and an antenna.

FIG. 2 shows the preferred embodiment of the onboard transceiver. The onboard transceiver consists of a onboard display 20 capable of displaying keystrokes entered with onboard keypad 23. Display 20 is any custom or standard display capable of displaying alpha-numeric characters. Onboard keypad 23 is interfaced directly to a microprocessor and the microprocessor will drive the display as well as drive the transmission circuits. The transmission circuitry can be any suitable protocol for the transmission of data. All circuitry for interfacing onboard display 20, onboard keypad 23 and onboard antenna 21 is contained within the handheld onboard housing 22. The microprocessor contained within onboard transceiver FIG. 2 will also receive data from the receiver network located within onboard housing 22. The receiver network located within onboard housing 22 is any receiver circuitry capable of receiving a signal generated by the underwater transceiver and relaying received data to the onboard microprocessor.

Figure 5:
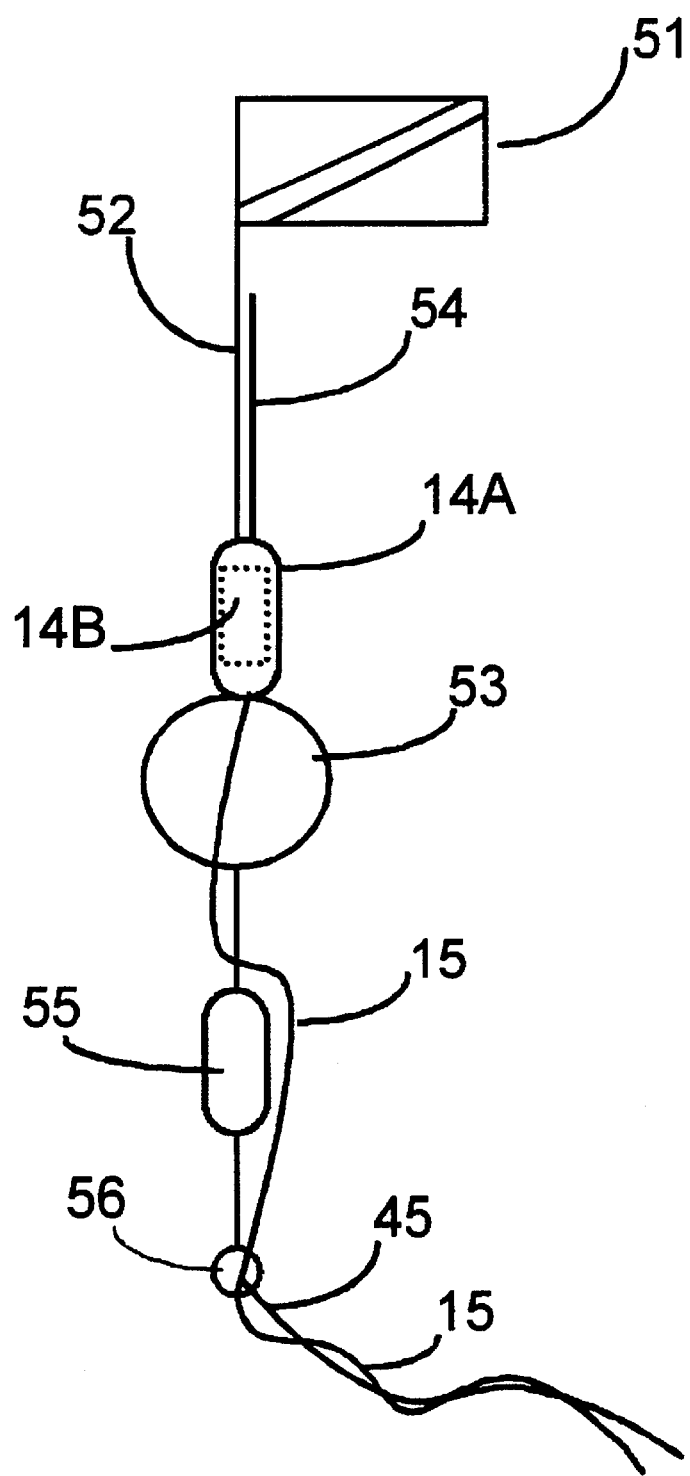
FIG. 5 shows the floating antenna assembly.

After the operator enters the keystrokes the alpha-numeric characters can be transmitted to floating antenna FIG. 5 via the onboard antenna 21 connected to onboard transceiver FIG. 2. Onboard housing 22 containing onboard transceiver's electronic networks is waterproof and resilient to corrosion.

Figure 3:
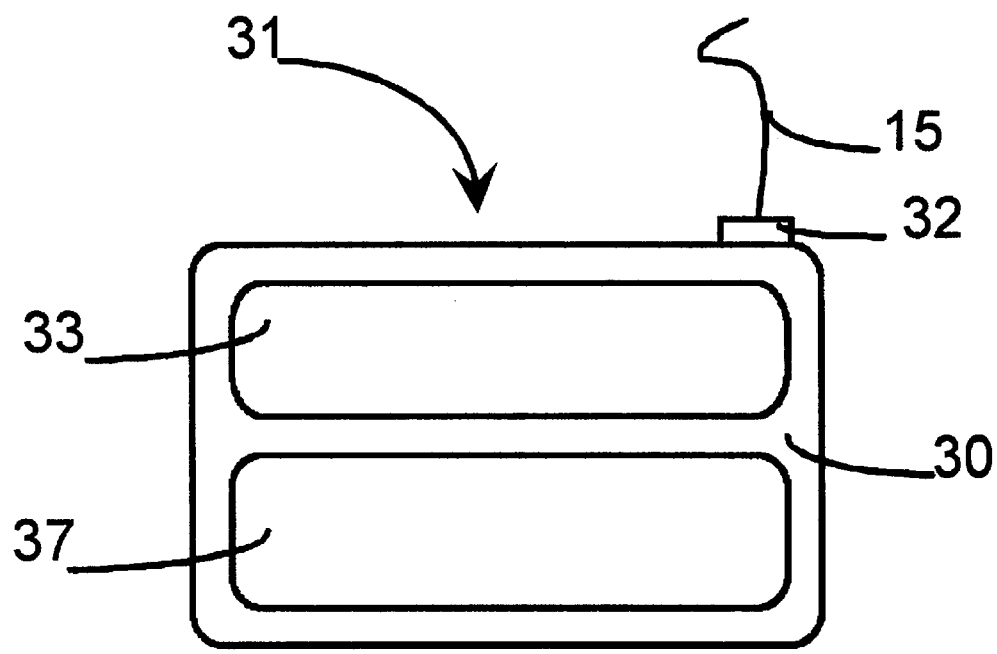
FIG. 3 shows the front view of the underwater transceiver containing a display, a keyboard, and a cable connection to the floating antenna assembly.

FIG. 3 shows the preferred embodiment for the underwater transceiver. The underwater transceiver consists of a water proof corrosion resilient underwater housing 30 similar to onboard housing 22 of the onboard transceiver FIG. 2. Underwater transceiver FIG. 3 consists of a display 33 capable of displaying keystrokes entered with underwater keypad 37. The underwater transceiver connects to the floating antenna via a cable 31. Cable 31 is attached to housing 30 at a very rugged socket 32. Underwater display 33 is any standard or custom display capable of displaying alpha-numeric characters. Underwater keypad 37 is any custom or standard keypad and is interfaced with a microprocessor identical to the microprocessor contained in the onboard transceiver FIG. 2. The microprocessor contained in the underwater transceiver drives underwater display 33 and drives transmit receive network 14B located on floating antenna assembly FIG. 5. The microprocessor contained within underwater transceiver FIG. 3 will receive data from the onboard transceiver FIG. 2 and display this data on underwater display 33.

Transceiver network 14B consists of circuitry capable of receiving and transmitting data by a suitable data transmission protocol. The receiver section of transmit receive network 14B will receive data from onboard transceiver FIG. 2 and send this data via cable 15 to the microprocessor located within underwater housing 30. The transmitter section of the circuitry contained within transmit receive network 14B will be driven by the microprocessor located within underwater housing 30 and is capable of sending alpha-numeric data to onboard transceiver FIG. 2 via antenna 54.

Figure 4:
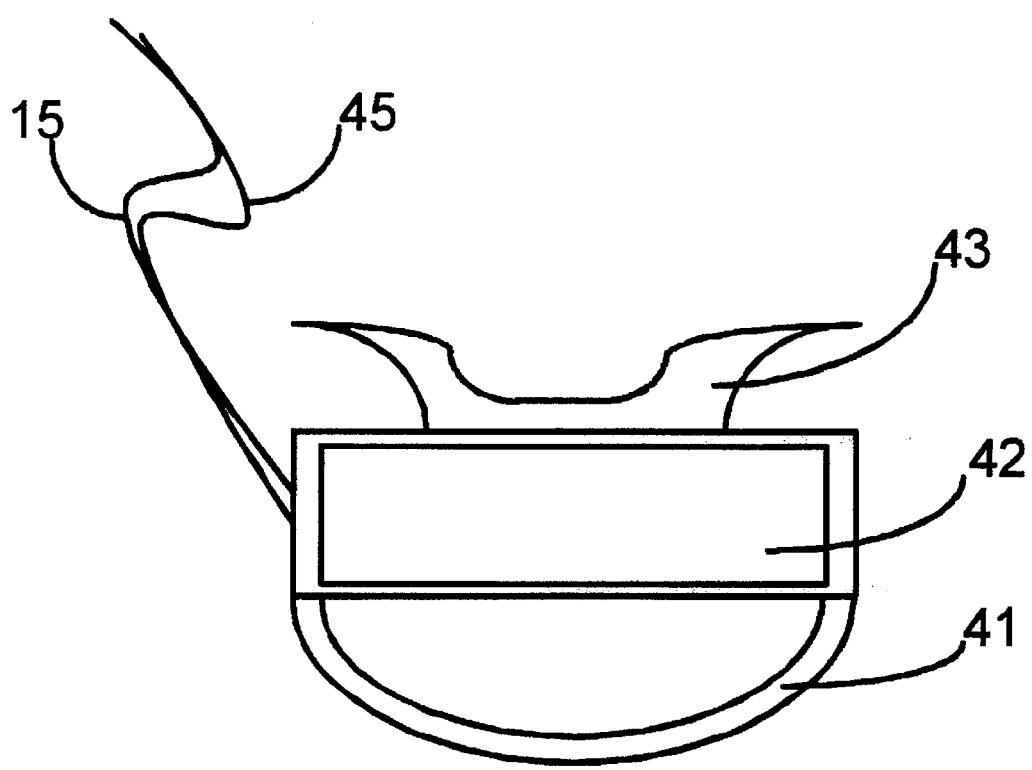
FIG. 4 shows the underwater handle assembly or handle assembly used to hold the underwater transceiver and to tend the tending line connected to the floating antenna assembly.

FIG. 4 shows the preferred embodiment for carrying the underwater transceiver. A durable handle assembly 40 is used to tend cable 15 connecting the floating antenna assembly FIG. 5 to the underwater transceiver FIG. 3. Entertwined with cable 15 is a tending line 45 connected to antenna assembly FIG. 5 at mounting ring 56. Tending line 45 is used to relieve any strain on cable 15. Handle assembly 40 is made of a corrosive resilient material and is created in such a way as to allow the underwater transceiver FIG. 3 to be attached within the material at position 42. Tending line 45 will be attached directly to handle assembly FIG. 4. Handle assembly FIG. 4 will also consist of a cleat 43 where the operator can roll tending line 45 and cable 44 onto during surfacing. Handle assembly FIG. 4 will also consist of a grasping area 41 for the operator to hold handle assembly FIG. 4.

FIG. 5 shows the preferred embodiment of the floating antenna assembly previously depicted in FIG. 1. This antenna assembly is composed of a required dive flag 51, buoy 53, weight 55 and connecting rod 52. Antenna 54 used by the underwater transceiver FIG. 3 is attached to the top of buoy 53 directly above the transmission network housing 14A. Transmit and receive network 14B is connected to the underwater transceiver FIG. 3 via cable 15. The floating antenna assembly FIG. 5 is connected to handle assembly FIG. 4 by tending line 45 of FIG. 4 and FIG. 5. Tending line 45 is connected to antenna assembly FIG. 5 at mounting ring 51.

OPERATION OF INVENTION

The preferred embodiment of the present invention requires at the minimum two operators a surface operator and an underwater operator. The surface operator will be able to send and receive alpha-numeric messages using the onboard transceiver FIG. 2. The underwater operator will be able to send and receive messages using underwater transceiver FIG. 3. Both transceivers are exactly the same shape and size and both operate exactly the same. The only difference between the two transceivers is the location of the antenna and the location of the transmit and receive networks The preferred embodiment of the onboard housing 22 is composed of a front side and a backside each created from a strong hard plastic material. These two sides are joined together with stainless steel screws and are created such as to provide a watertight seal. For example a o-rings around all screws and around the seal between the front and backsides. Onboard display 20 fits into the front side of onboard housing 22 and a watertight seal is maintained around the display. Onboard antenna 21 is permanently mounted into onboard housing 22 and a watertight seal is maintained.

Onboard transceiver FIG. 2 allows the surface operator to type in a message using keypad 23 while viewing the characters on onboard display 20. Both onboard display 20 and onboard keypad are enclosed in onboard housing 22 as a single unit. Onboard housing 22 is of a size small enough to be hand held by the onboard operator. After the onboard operator has entered a message and views it on onboard display 20 the operator presses a button on onboard keypad 23 to send the message. This message consists of alpha-numeric information and is sent to the underwater operator via onboard antenna 21. The size of the display will not determine the maximum number of characters capable of being sent. As more characters are entered than the display can depict at one time the first characters will scroll off the display.

When onboard transceiver FIG. 2 receives a message the unit will emit an audible alarm to inform the onboard operator of the received message. The onboard operator can view the received message on onboard display 20. If the received message consists of more characters than onboard display 20 can show at one time the onboard operator can simply press a button on onboard keypad 23 to view the next lines of information. After the onboard operator reads the received message the onboard operator can then press a button on onboard keypad 23 to send a short message to the underwater operator verifying receipt of the message. For example the letters OK may be sent by pressing a single button on onboard keypad 23.

The preferred embodiment of the underwater transceiver housing 30 is identical to the onboard transceiver except for the mounting of the antenna. Underwater transceiver FIG. 3 is attached to floating antenna assembly FIG. 5 by cable 15 capable of carrying an electrical signal. Cable 15 connects to underwater housing 30 by a waterproof connector attached to underwater housing 30.

When underwater handle assembly 40 is used underwater transceiver FIG. 3 is mounted within the handle assembly at mounting position 42. Cable 15 will still be attached to underwater transceiver FIG. 3 and floating antenna assembly FIG. 5 but tending line 45 will absorb all tension between underwater transceiver FIG. 3 and floating antenna assembly FIG. 5. Cable 15 is wrapped around tending line 45 in a manner as to allow cable 15 not to be damaged. For example cable 15 will be twisted around tending line 45 at 5 turns per foot of tending line 45. Tending line 45 is attached to handle assembly 40 not directly to underwater transceiver FIG. 3 and is attached to floating antenna assembly 50 at attachment ring 51.

Underwater transceiver FIG. 3 allows the underwater operator to send a alpha-numeric message to the onboard operator. The underwater operator types in a message using underwater keypad 37 and views the message on underwater display 33. The size of the display will not determine the maximum number of characters capable of being sent. As more characters are entered than the display can depict at one time the first characters will scroll off the display. The underwater operator can then send the message by pressing the send button on underwater keypad 33.

Both underwater transceiver FIG. 3 and onboard transceiver FIG. 2 has the capability of storing commonly used messages. The operators will simply type in the message and press the store button located on the keypad. This store button will allow the operator to assign a number to the message and when the operator wishes to send a prerecorded message only two to four key strokes will be required.

When underwater transceiver FIG. 3 receives a message from onboard transceiver FIG. 2 the unit emits an audible alarm. The underwater operator can then view the received message on underwater display 33. After the underwater operator receives a message the underwater operator can then press a single button located on underwater keypad 37 to send a short prerecorded message to the onboard operator such as "OK" to verify receipt of transmitted data.

CONCLUSIONS, RAMIFICATIONS, AND SCOPE

While my above description contains many specificities, these should not be construed as limitations on the scope of the invention, but rather as an exemplification of one preferred embodiment thereof. Many other variations are possible. For example cable 15 used to connect underwater transceiver FIG. 3 to antenna assembly FIG. 5. may be a sturdy fiber optic cable thus preventing any damage to the cable by salt water as well as preserving the integrity of the data being carried by the cable.

underwater transceiver FIG. 3 may simply consist of a receiver capable of displaying a message from the onboard operator. Therefore not allowing the underwater operator to transmit information to the surface vessel.

the microprocessor used to drive the underwater display may be located within network housing 14A. This would allow for a smaller underwater transceiver housing 30.

Accordingly, the scope of the invention should be determined not by the embodiment illustrated, but by the appended claims and their legal equivalents.

What is claimed is:

1. A communication system for the transmission and reception of keyed in digital messages between an underwater diver and an above-water vessel comprising:

(a) an above-water hand held transceiver unit comprising an attached antenna means for transmitting radio frequency modulated digital messages through the air and also providing means for reception of airborne radio frequency modulated digital messages, means for viewing said received messages and for viewing said keyed in messages prior to transmission, means for entering in messages for transmission and control of unit functions, a housing means for protection of electronic components, (b) an underwater hand held transceiver unit comprising an attached antenna means for transmitting radio frequency modulated digital messages through the air and also providing means for the reception of airborne radio frequency modulated digital messages, means for viewing said received messages and for viewing said keyed in messages prior to transmission, means for entering in messages for transmission and control of unit functions, a housing means for protection of electronic components, whereby no attachments directly to underwater diver or diver's equipment are necessary, (c) a molded sturdy plastic handle providing a location of predetermined size whereby said underwater hand held transceiver unit may be mounted while providing a second location of predetermined size whereby an underwater diver may grasp said plastic handle.

2. The system of claim 1 wherein said antenna means of said above-water hand held transceiver is of a predetermined minimum length and constructed of a durable corrosion resistant material.

3. The system of claim 1 wherein said antenna means of said above-water hand held transceiver contains means for being securely fastened onto said above-water hand held transceiver while maintaining watertight integrity of said above-water hand held transceiver.

4. The system of claim 1 wherein said above-water hand held transceiver contains said means for viewing said keyed in messages and viewing said received messages comprises a display means of predetermined minimum size.

5. The system of claim 4 wherein said display means provides means for maintaining waterproof integrity of said above-water hand held transceiver.

6. The system of claim 1 wherein said above-water hand held transceiver contains said means for entering messages and controlling unit functions comprises a keypad means of a predetermined minimum size and constructed of a durable corrosion resistant material.

7. The system of claim 6 wherein said keypad means provides means for maintaining waterproof integrity of said above-water hand held transceiver.

8. The system of claim 1 wherein said housing means of said above-water hand held transceiver is composed of a molded sturdy and waterproof material providing means for the protection of incorporated electronics and means for maintaining waterproof integrity of said above-water hand held transceiver.

9. The system of claim 1 wherein said housing means of said above-water hand held transceiver is of a predetermined size so as to allow the entire unit to be held in one hand.

10. The system of claim 1 wherein said antenna means attached to said underwater hand held transceiver is of a predetermined minimum length and constructed of a durable corrosion resistant material.

11. The system of claim 1 wherein said antenna means of said underwater hand held transceiver is attached directly to the underwater hand held transceiver by means of a minimum diameter conducting cable of a predetermined minimum length whereby the diver is able to tow the antenna through the water.

12. The system of claim 1 wherein said antenna attached to said underwater hand held transceiver is of length less than 1 foot and weight less than 1 pound therefore capable of being supported vertically at the surface of the water by means of any suitable floatation device.

13. The system of claim 1 wherein said underwater hand held transceiver contains said means for viewing received messages and for viewing keyed in messages comprises a display means of predetermined minimum size.

14. The system of claim 13 wherein said display means provides means for maintaining waterproof integrity of said underwater hand held transceiver.

15. The system of claim 1 wherein said underwater hand held transceiver contains means for entering messages and controlling unit functions comprises a keypad constructed of a durable corrosion resistant material.

16. The system of claim 15 wherein said keypad means provides means for maintaining waterproof integrity of said underwater hand held transceiver.

17. The system of claim 1 wherein said housing means of said underwater hand held transceiver is composed of a molded sturdy and waterproof material providing means for the protection of incorporated electronics.

18. The system of claim 1 wherein said housing means of said underwater hand held transceiver is of a predetermined minimum size thereby allowing the entire unit to be held in one hand.

19. The system of claim 1 wherein said molded sturdy plastic handle is of a predetermined minimum size and weight, thereby allowing said handle not to be unwieldy to a submerged underwater diver.

* * * * *